United States Patent
Sakamoto et al.

(10) Patent No.: US 7,349,122 B2
(45) Date of Patent: Mar. 25, 2008

(54) PRINTER AND METHOD FOR CONTROLLING SAME

(75) Inventors: Atsushi Sakamoto, Kanagawa (JP); Yuji Hamasaki, Kanagawa (JP); Hidehiko Kanda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 597 days.

(21) Appl. No.: 10/915,357

(22) Filed: Aug. 11, 2004

(65) Prior Publication Data
US 2005/0007623 A1    Jan. 13, 2005

Related U.S. Application Data

(62) Division of application No. 10/252,585, filed on Sep. 24, 2002, now Pat. No. 6,820,956.

(30) Foreign Application Priority Data
Oct. 1, 2001    (JP) ............................. 2001-305409

(51) Int. Cl.
*B41J 2/165* (2006.01)
*G06K 15/00* (2006.01)

(52) U.S. Cl. .................... 358/1.8; 358/1.14; 347/23

(58) Field of Classification Search ............. 358/1.8, 358/1.9, 1.14, 1.15; 347/3, 19, 20, 22, 23, 347/7, 85, 86; 134/56 R
See application file for complete search history.

(56) References Cited

U.S. PATENT DOCUMENTS

| | | | |
|---|---|---|---|
| 5,786,829 A * | 7/1998 | Pasciak et al. ............... 347/28 |
| 5,847,726 A | 12/1998 | Hori | |
| 5,923,347 A * | 7/1999 | Wade ........................... 347/28 |
| 5,942,043 A * | 8/1999 | Suemune ...................... 134/18 |
| 5,949,447 A | 9/1999 | Arai et al. | |
| 6,079,808 A * | 6/2000 | Yamaguchi .................. 347/30 |
| 6,364,442 B1 | 4/2002 | Kawase et al. | |
| 6,398,336 B1 * | 6/2002 | Yoda et al. ................... 347/23 |
| 6,497,469 B1 | 12/2002 | Shinada et al. | |
| 6,580,520 B1 * | 6/2003 | Teradaira et al. .......... 358/1.15 |
| 6,655,780 B2 * | 12/2003 | Kimura ....................... 347/23 |
| 6,693,717 B1 * | 2/2004 | Teradaira et al. .......... 358/1.14 |
| 6,820,956 B2 * | 11/2004 | Sakamoto et al. ............. 347/7 |
| 6,823,877 B2 * | 11/2004 | Kimura .................... 134/56 R |
| 6,969,136 B1 * | 11/2005 | Matsumoto et al. ........... 347/7 |
| 2001/0015818 A1 * | 8/2001 | Kawanabe et al. ........ 358/1.15 |

(Continued)

FOREIGN PATENT DOCUMENTS

EP    1 004 976    5/2000

(Continued)

Primary Examiner—Kimberly A. Williams
(74) Attorney, Agent, or Firm—Fitzpatrick, Cella, Harper & Scinto

(57) ABSTRACT

A printer having storing means storing time information indicating the time at which cleaning operations were last performed, with the initial value of time information stored in the storing means being set to a time later than the shipment of the printer. Elapsed time between the time information stored in the storing means and the current time is calculated when a user gives the printer an instruction to start printing operations. The printer performs suitable cleaning operation for a case wherein the calculated value of the elapsed time is negative.

19 Claims, 5 Drawing Sheets

U.S. PATENT DOCUMENTS

| | | |
|---|---|---|
| 2002/0105565 A1 | 8/2002 | Suda et al. |
| 2003/0058299 A1* | 3/2003 | Endo .......................... 347/23 |
| 2003/0063142 A1* | 4/2003 | Sakamoto et al. ............. 347/5 |
| 2005/0007623 A1* | 1/2005 | Sakamoto et al. ......... 358/1.14 |
| 2005/0168516 A1* | 8/2005 | Koike et al. .................. 347/23 |
| 2006/0164448 A1* | 7/2006 | Sugiyama et al. ............. 347/5 |
| 2007/0091140 A1* | 4/2007 | Taga .......................... 347/30 |

FOREIGN PATENT DOCUMENTS

| | | |
|---|---|---|
| JP | 2000-163225 | 6/2000 |

* cited by examiner

| ELAPSED TIME (HOUR) | TYPE OF CLEANING |
| --- | --- |
| 0 TO LESS THAN 24 | PRELIMINARLY EJECTION ONLY |
| 24 TO LESS THAN 60 | SUCTION A+PRELIMINARLY EJECTION |
| 60 TO LESS THAN 240 | SUCTION A×1.5+PRELIMINARLY EJECTION |
| 240 TO LESS THAN 960 | SUCTION A×3+PRELIMINARLY EJECTION |
| 960 OR MORE | SUCTION A×4.5+PRELIMINARLY EJECTION |

FIG. 4

| ELAPSED TIME (HOUR) | TYPE OF CLEANING |
|---|---|
| LESS THAN 0 | UNLOAD SUCTION+PRELIMINARLY EJECTION |
| 0 TO LESS THAN 24 | PRELIMINARLY EJECTION ONLY |
| 24 TO LESS THAN 60 | SUCTION A+PRELIMINARLY EJECTION |
| 60 TO LESS THAN 240 | SUCTION A×1.5+PRELIMINARLY EJECTION |
| 240 TO LESS THAN 960 | SUCTION A×3+PRELIMINARLY EJECTION |
| 960 OR MORE | SUCTION A×4.5+PRELIMINARLY EJECTION |

FIG. 5

PRINTER AND METHOD FOR CONTROLLING SAME

This is a division of application Ser. No. 10/252,585, filed Sep. 24, 2002 now U.S. Pat. No. 6,820,956.

BACKGROUND OF THE INVENTION

1. Field of the Invention

The present invention relates to a printer for performing printing on a recording medium. More particularly, the present invention relates to a printer that is connected to an information processing apparatus acting as a host and performs printing on the basis of data transmitted from the information processing apparatus. The present invention further relates to both a method for synchronizing time information transmitted from the information processing apparatus and the time information of the printer and a method for performing preprinting preparation operations by using the time information, which allows the user to perform printing with stability when he/she performs printing for the first time after he/she has bought the printer.

2. Description of the Related Art

Some printers that perform printing on a recording medium perform predetermined preliminary operations before performing actual printing operations.

For example, an ink-jet printer that performs printing by using an ink-jet head, which ejects ink onto a recording medium, has a head-cleaning system. The head cleaning system is used for preventing the ink from drying when it is not used and choking the nozzle of the ink-jet head. For maintaining a good printing quality, head cleaning including a suction operation and a preliminary ejection operation is performed at predetermined time intervals. In many cases, the head cleaning is automatically performed at the start of printing. That is to say, the printing triggers the head cleaning.

It takes much time until the printing is started after the user gives the instruction to start printing, since it takes much time for the printer to become ready to start printing after performing many kinds of data processing. Further, the above-described head cleaning or the head maintenance can be performed after the printer is ready to start printing after it develops the print data to the buffer thereof. Therefore, the time required until the start of printing is determined by adding the time required for the head cleaning to the time required for the data processing. Accordingly, the time from when the user gives the printer his/her instruction to start printing until the completion of printing becomes long.

An invention for solving the above-described problem is disclosed in Japanese Patent Laid-Open No. 2000-163225. According to the invention, when a user gives a printer an instruction to start printing, a host that is an information processing apparatus (including a personal computer) transmits a preprinting notice signal to the printer before transmitting print data thereto. The printer translates the signal received via the communication means thereof. When the translation shows that the signal instructs the printer to perform preprinting preparation operations, the printer starts performing the preprinting preparation operations, such as cleaning required for performing printing, before receiving the print data. When the signal sent to the printer is the print data, the printer performs printing on the basis of the print data.

The preprinting notice signal transmitted from the information processing apparatus may include time information, an instruction to perform a preliminary operation, resolution of print area, image size, type of paper, feeding method, and so forth. Recently, the ink-jet printer, which is connected to the host and has communication means, calculates the non-operating time thereof by using the time information and performs cleaning including suction, preliminary ejection, and so forth corresponding to the calculated non-operating time. Incidentally, when the printer has a timer, which is used for measuring the non-operating time, and performs suction by using it, these operations are referred to as timer suction.

The above-described printer, which has the communication means for communicating with the information processing apparatus, uses the time information transmitted from the information processing apparatus so that the printer can perform preprinting preliminary operations corresponding to the non-operating time of the printer when the AC power supply of the printer is turned off. However, when the information processing apparatus transmits the time information to the printer for the first time after the user bought the printer, the printer cannot perform the preprinting preparation operations properly. This is because the printer does not have information about the time between the shipment time thereof and the time when the user will operate the printer for the first time after the purchase thereof.

SUMMARY OF THE INVENTION

To this end, a printer according to an aspect of the present invention performs printing operations on a recording medium. The printing operations are performed on the basis of the data transmitted from an information processing apparatus. The printer comprises a preprinting preparation unit for performing predetermined preparation operations. The predetermined preparation operations are performed before the printing operations are performed. The printer further comprises a storing unit for storing first time information indicating the time when the predetermined preparation operations were last performed. The printer further comprises a controlling unit that receives second time information about the current time transmitted from the information processing apparatus. The control unit also calculates the time elapsed between the time indicated by the first time information, representing the time when the predetermined preparation operations were last performed, and the time indicated by the second time information, representing the current time, and controls the predetermined preparation operations on the basis of the elapsed time. The printer further comprises an information-updating unit for updating the first time information stored in the storing unit at the time when the predetermined preparation operations are performed. The controlling unit controls the predetermined preparation operations irrespective of whether the value of the elapsed time is calculated to be positive or negative.

Preferably, the initial value of the first time information of the storing unit may be set to a time later than the shipment time of the printer.

Preferably, the initial value of the first time information stored in the storing unit may be set to a time determined by adding a predetermined time to the shipment time of the printer.

Preferably, the initial value of the first time information stored in the storing unit may be set to a time later than a period in which the printer is expected to be used, and the calculated value of the elapsed time may be negative when the printing operations are performed for the first time.

Preferably, the period may be determined on the basis of the lifecycle of the printer.

Preferably, when the calculated value of the elapsed time is negative, the control unit may control the predetermined preparation operations so as to suit to a case where the printing operations are performed in the printer for the first time.

Preferably, the printer may be an ink-jet printer, which performs printing by ejecting ink onto the recording medium by using an ink-jet head that ejects ink, and the predetermined preparation operations may be cleaning operations performed by the ink-jet head.

Preferably, the control unit may control the ink-jet head to perform the cleaning operations corresponding to the elapsed time.

Preferably, the printer may further comprise a table that defines the cleaning operations corresponding to the elapsed time, and the control unit may refer to the table on the basis of the elapsed time and may select the cleaning operations.

Preferably, the printer may further comprise a preliminary ejection unit for performing cleaning operations by making the ink-jet head eject the ink and a suction unit for performing ink discharge by applying a suction to the ink-jet head. The control unit may perform the cleaning operations corresponding to the elapsed time by using the preliminary ejection means and the suction means.

According to another aspect of the present invention, there is provided a method for controlling a printer for performing printing operations on a recording medium on the basis of data transmitted from an information processing apparatus and predetermined preparation operations before the printing operations are performed. The method comprises the step of receiving first time information about the current time from the information processing apparatus. The method also includes a step of calculating time that elapsed between the time indicated by the first time information, representing the current time, and a time indicated by second time information, representing the time when the predetermined preparation operations were last performed. The second time information is stored in the storing unit of the printer. The method further comprises the steps of preparing by controlling and performing the predetermined preparation operations on the basis of the calculated elapsed time and updating the second time information stored in the storing unit at the time when the predetermined preparation operations are performed. The step of preparing is performed by controlling the predetermined preparation operations irrespective of whether the value of the calculated elapsed time is positive or negative.

Preferably, in the above-described method, the initial value of the second time information of the storing unit may be set to a time later than the shipment time of the printer.

Preferably, in the above-described method, the initial value of the second time information stored in the storing unit may be set to a time determined by adding a predetermined time to the shipment time of the printer.

Preferably, in the above-described method, the initial value of the second time information stored in the storing unit may be set to a time later than a period in which the printer is expected to be used, and the calculated value of the elapsed time may be negative when the printing operations are performed for the first time.

Preferably, in the above-described method, the period may be determined on the basis of the lifecycle of the printer.

Preferably, in the above-described method, when the calculated value of the elapsed time is negative, the preparation operations may be controlled so as to suit a case where the printing operations are performed in the printer for the first time.

According to another aspect of the present invention, there is provided a printer that is connected to an information processing apparatus and comprises a program for giving the printer an instruction about operations. The printer performs printing on the basis of data transmitted from the information processing apparatus. The printer comprises a communication unit for communicating with the information processing apparatus, a receiving unit for receiving notice of time information transmitted from the information processing apparatus via the communication unit, and a storing unit for storing the value of an initial time. The initial time is set at the shipment time of the printer. The printer further comprises a calculating unit for comparing the time information and the value of the initial time and calculating the difference therebetween, and an updating unit for updating the value of the initial time according to the time information. The initial time is set to a time later than the shipment time of the printer.

Preferably, the initial time of the printer may be set to a time in the future determined by adding a predetermined time to the shipment time of the printer.

Preferably, the initial time of the printer may be set to a time in the future determined by adding a time as long as the lifecycle of the printer to the shipment time of the printer.

Preferably, the initial time of the printer may be set to a time in the future determined by adding a time as long as three years or more to the shipment time of the printer.

Preferably, the program may be a printer driver and the printer may receive the time information from the information processing apparatus via the printer driver.

Preferably, the updating may be performed at the time when the printer receives the time information from the information processing apparatus for the first time after the power of the printer is turned on.

Preferably, the preparation operations may be performed, the preparation operations being required for performing printing corresponding to the calculated difference.

Preferably, the printer may be an ink-jet printer, and the preparation operations may be any one of ink-suction recovery, preliminary ejection, preliminary heating of a fuser, aligning of a stepping motor, register processing of a printer head on the basis of the standard position thereof, initializing of a memory such as a command buffer or the like.

According to another aspect of the present invention, there is provided a printer for performing a printing operation on the basis of data transmitted from an external information processing apparatus. The printer comprises a printer head for ejecting ink, a recovery system for performing recovery processing for the printer head, a memory for storing time information, and a controlling unit. The controlling unit controls the recovery processing on the basis of the time information, and updates the time information corresponding to the time when the recovery processing is performed. The controlling means modifies the recovery processing on the basis of whether the time information indicates a time later than the current time or a time earlier than the current time.

Thus, when the user performs printing for the first time after he/she has bought the printer of the present invention, the printer performs the preprinting preparation operations and printing with stability.

Further objects, features and advantages of the present invention will become apparent from the following description of the preferred embodiments with reference to the attached drawings.

BRIEF DESCRIPTION OF THE DRAWINGS

FIG. 4 is a table showing the types of cleaning selected corresponding to elapsed time.

FIG. 5 is another table showing the types of cleaning selected corresponding to elapsed time according to the embodiments of the present invention.

DESCRIPTION OF THE PREFERRED EMBODIMENTS

The preferred embodiments of the present invention will now be described with reference to the attached drawings.

In this specification, "to print" refers to forming not only significant information such as a character or a figure but also insignificant information. "To print" further refers to forming an image, a design, or a pattern on a recording medium irrespective of whether or not they are presented so that they can be recognized by people. "To print" also means processing on the recording medium.

The recording medium refers to not only paper used for general printers but also things that can accept ink such as a cloth, a plastic film, a metal plate, glass, ceramics, wood, leather, and so forth.

The ink, which will sometimes be described as "a liquid" in this specification, should have broad meaning as in the case of the expression "to print". That is, the ink is a liquid that is applied on the recording medium so as to form the image, the design, the pattern and so forth thereon, or to perform processing thereon. Further, the ink should be suitable for processing, such as consolidating or insolubilizing of colorant therein.

The following is the explanation of an ink-jet printer, which is an exemplary printer to which the present invention can be applied.

Figure 2:
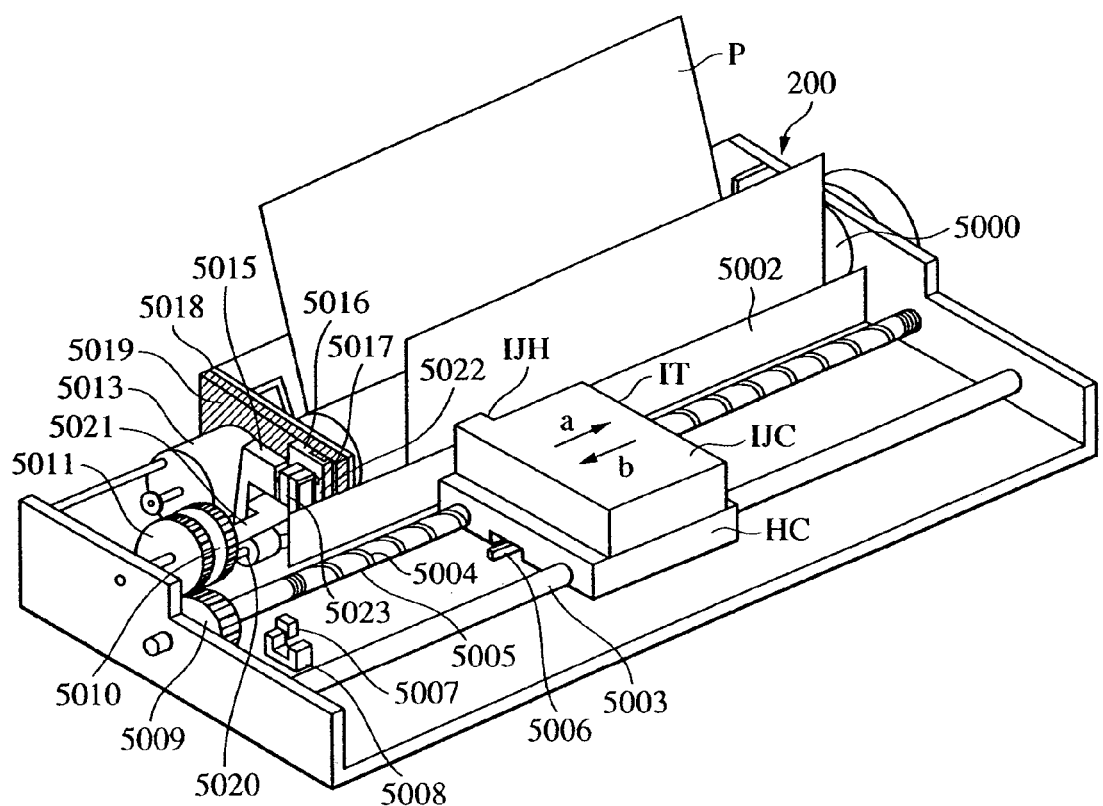
FIG. 2 is a perspective view of an ink-jet printer that can be applied to the present invention.

FIG. 2 is a perspective view of the ink-jet printer as mentioned above (hereinafter referred to as the printer 200) according to a first embodiment of the present invention.

The printer 200 comprises a platen 5000, a paper-holding plate 5002, a helical groove 5004, a lead screw 5005, photo sensors 5007 and 5008, driving-power transfer gears 5009 and 5011, a driving motor 5013, suction means 5015, a holding member 5016, a cleaning blade 5017, a body-supporting plate 5018, a blade-moving member 5019, a cam 5020, a suction-starting lever 5021, a cap member 5022, an aperture 5023, a printer head, a carriage HC, an ink-jet cartridge IJC, and so forth.

The lead screw 5005 rotates in synchronization with the driving motor 5013, which rotates in normal and reverse directions, via the driving-power transfer gears 5009 and 5011. The carriage HC has a pin (not shown) that hitches and fits into the helical groove 5004, and reciprocates in the a and b directions shown in the drawing in synchronization with the rotation of the lead screw 5005. On the carriage HC, the ink-jet cartridge IJC is mounted. The paper-holding plate 5002 presses paper against the platen 5000 along the moving directions of the carriage HC. The photo sensors 5007 and 5008 are home-position detection means, which perform confirmation of the existence of the lever 5006 in their corresponding areas, switching the rotating direction of the motor 5013, and so forth. The holding member 5016 holds the cap member 5022, which caps the front of the printer head. The suction means 5015 sucks the ink in the cap member 5022 via the aperture 5023 for suction recovery of the printer head. The blade-moving member 5019 allows the cleaning blade 5017 to move back-and-forth. The cleaning blade 5017 and the blade-moving member 5019 are supported by the body-supporting plate 5018. Of course, a commonly used cleaning blade can also be used as the cleaning blade 5017.

The suction-starting lever 5021 for the suction recovery moves in synchronization with the movement of the cam 5020, which hitches and fits into the carriage HC. The movement of the suction-starting lever 5021 can be controlled by a known method such as clutching or declutching the driving motor 5013 so as to switch the driving power thereof.

When the carriage HC is in the home position, the capping operation (hereinafter referred to as the capping), the cleaning, and the suction recovery are performed on each corresponding part by the operation of the lead screw 5005.

Figure 1:
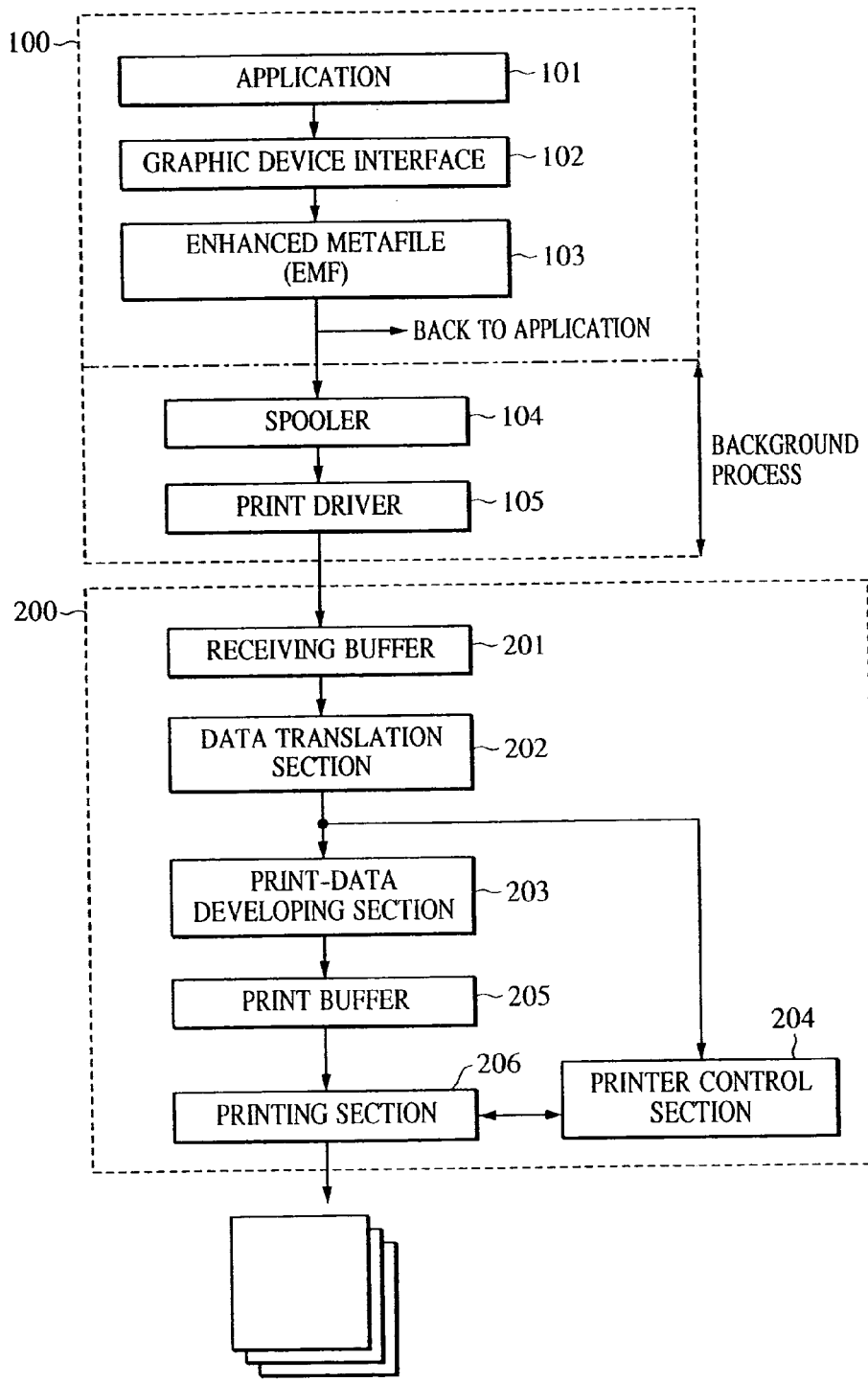
FIG. 1 illustrates the flow of processing procedures from when a user gives a printer an instruction to start printing until the printing is performed.

FIG. 1 illustrates a host 100 and the printer 200. The host 100 comprises an application 101, a GDI (Graphic Device Interface) 102, an enhanced metafile (EMF) 103, a spooler 104, and a print driver 105. The printer 200 comprises a receiving buffer 201, a data translation section 202, a print-data developing section 203, a printer control section 204, a print buffer 205, and a printing section 206.

With reference to the drawing, processing procedures performed in the host 100 and the printer 200 will be described in order. A personal computer (hereinafter referred to as the PC) that uses Windows 95 of Microsoft Corporation as its operating system will be described as an example of the host 100, which sends data to the printer 200.

When the user operates the host apparatus 100 by giving it an instruction to perform printing, the application 101, which operates on the operating system thereof, requests the GDI 102 for a device context (DC) by using Create Enhanced Metafile (EMF) AIP and makes the EMF 103. The EMF 103 is translated by the spooler 104, and is transmitted to the printer driver 105 as a print job. In the printer drier 105, processing procedures such as color processing, rasterizing, and binarizing are performed, and the EMF 103 is converted to a printer command and is transmitted to the printer 200.

Generally, when the printer 200 receives data from the host 100, the data is stored in the receiving buffer 201. The data translation section 202 retrieves the data from the receiving buffer 201, translates it, and transmits it to the corresponding processing section. When the data is related to printing, the data is transmitted to the print-data developing section 203 and is developed to image data. The developed image data is stored in the print buffer 205. When the amount of the stored data becomes as much as a band required for one scan, the printing section 206 starts paper feeding and printing.

The head of an ink-jet printer such as the printer 200 shown in FIG. 2 needs cleaning in order to maintain a high printing quality. Hitherto, the type of head cleaning was sometimes selected according to the amount of time that elapsed since the head was last cleaned. In general, ink-jet printers perform pre-processing procedures such as head cleaning when printing is started, that is, when the amount of image data, which is stored in a print buffer such as the print buffer 205, reaches a required amount for one scan. The head cleaning includes preliminary operations performed for preliminarily ejecting the ink, and a suction operation for draining the ink out of the head by suction.

Figure 3:
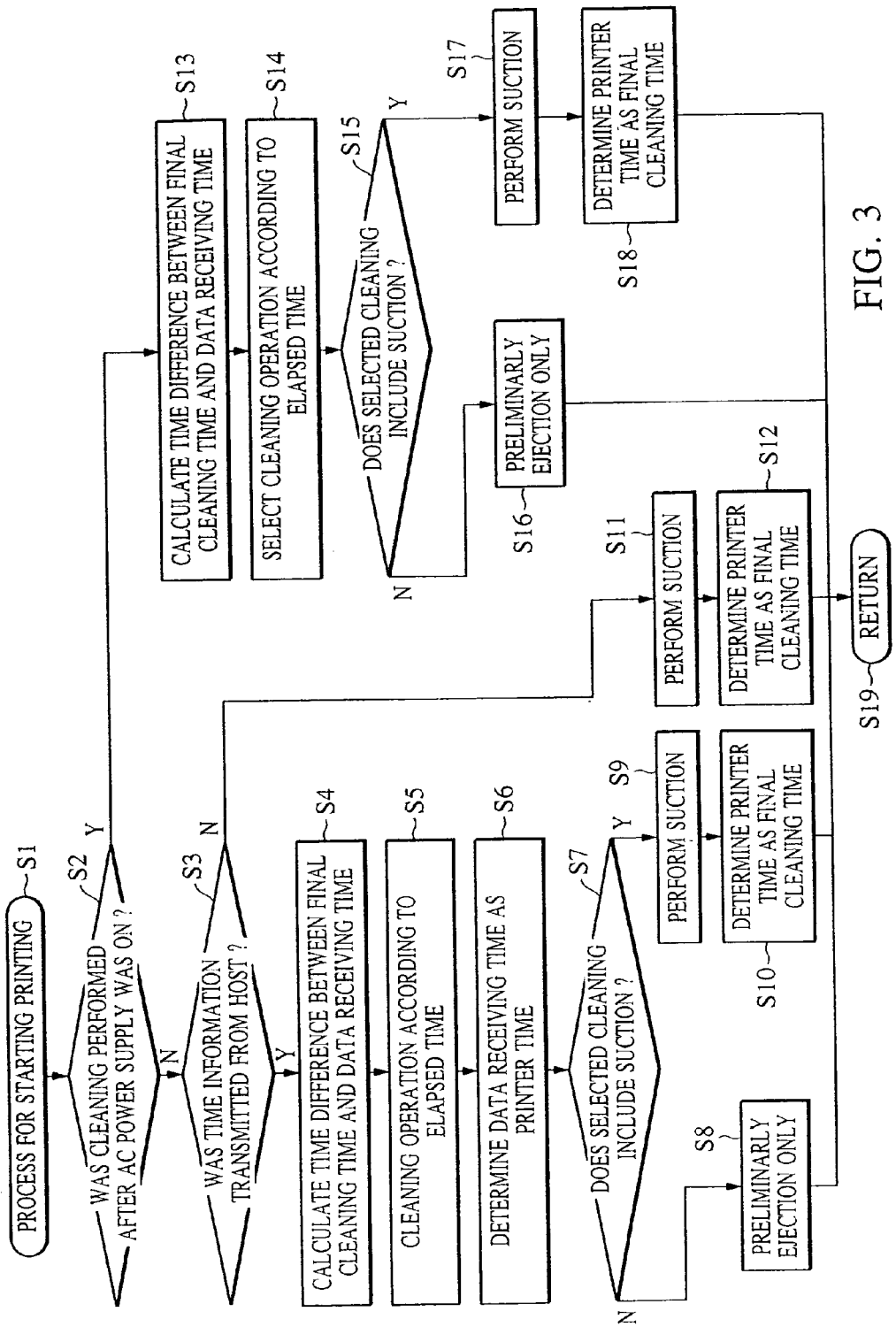
FIG. 3 is a flowchart illustrating the embodiments of the present invention.

FIG. 3 is a flowchart illustrating processing procedures performed by a host and a printer. The printer performs preprocessing such as head cleaning according to the amount of time that elapsed since the printer performed head cleaning last. The time information of the host and that of the printer are synchronized. The printer is an ink-jet printer having the same configuration as that of the printer 200. The printer also performs preliminary operations such as the head cleaning before printing to improve ink ejection performance of the ink-jet head thereof. Further, recording means in the printer stores time information indicating when the head cleaning was performed last. The time information is referred to as the final cleaning time. Further, an electrically erasable programmable ROM (EEPROM) is applied as recording means.

At step S1, the printer receives print data from the host, and is ready for performing processing procedures for starting printing. At step S2, the printer determines whether or not head cleaning was performed from when the AC power was turned on. If the head cleaning was not performed, the processing procedure at step S3 is performed, that is, the printer determines whether it received the time information from the host or not. Incidentally, if the printer is a so-called NON-PC printer, which is not connected to a personal computer, the printer cannot receive the time information from the host, which is the personal computer.

When the printer determines that it received the time information from the host at step S3, the processing procedure of step S4 is performed. At step S4, the difference between the final cleaning time, which is stored in the EEPROM, and the print-data receiving time is calculated. Further, the time elapsed from when the cleaning was performed last is obtained. At step S5, cleaning is performed according to the elapsed time calculated at step S4. The cleaning is performed with reference to a table showing the types of cleaning, each type corresponding to the length of time that elapsed from when the cleaning was performed last.

FIG. 4 shows an example of the above-described table, which shows the types of cleaning. When the difference between the final cleaning time and the print-data receiving time (hereinafter referred to as the elapsed time) is 0 to less than 24 hours, only preliminary ejection is performed. When the elapsed time is 24 to less than 60 hours, suction A and the preliminary ejection are performed. When the elapsed time is 60 to less than 240 hours, suction A×1.5 and the preliminary ejection are performed. When the elapsed time is 240 to less than 960 hours, suction A×3 and the preliminary ejection are performed. When the elapsed time is 960 hours or more, suction A×4.5 and the preliminary ejection are performed.

Turning back to FIG. 3, the print-data receiving time is determined as the printer time at step S6. At step S7, it is determined whether or not the cleaning selected at step S5 includes suction. If the suction is not included, the processing procedure of step S8 is performed. That is to say, only preliminary ejection is performed, and the printer enters a printer-time determining state. Then, the flow of the processing procedures stops at step S19. On the other hand, when it is determined that the cleaning includes suction, processing procedure of step S9 is performed. That is to say, cleaning including suction is performed. At step S10, the printer time determined at step S6 is determined as the final cleaning time. Therefore, the final cleaning time stored in the EEPROM is updated. Then, the flow of the processing procedures stops at step S19.

When the printer cannot receive the time information from the host at step S3 for some reason, for example, when the printer is of the NON-PC printer type, cleaning including suction is performed at step S11. At step S12, the final cleaning time stored in the EEPROM is updated according to the elapsed time. Then, the flow of the processing procedures stops at step S19.

When it is determined that the cleaning was performed after the AC power of the printer was turned on at step S2, the difference between the final cleaning time and the print-data receiving time is calculated at step S13. At step S14, the type of cleaning suitable to the elapsed time is selected according to the difference calculated at step S13 by referring to the table shown in FIG. 4. At step S15, it is determined whether or not the selected cleaning includes suction. When the suction is not included, only preliminary ejection is performed at step S16. Then, the printer enters the time determining state, and the flow of the processing procedures stops at step S19. When it is determined that the suction is included in the selected cleaning at step S15, cleaning including suction is performed at step S17. At step S18, the printer time is determined as the final cleaning time, and the final cleaning time stored in the EEPROM is updated. Then, the flow of the processing procedures stops at step S19.

At the time when the user operates the printer for the first time after he/she bought it (hereinafter referred to as the unloading time), the type of cleaning is selected according to the initial value of the final cleaning time stored in the EEPROM of the printer. In such a case, unnecessary cleaning operations are performed, or necessary cleaning operations are not performed according to the final cleaning time. Accordingly, the printing quality is lowered. The reason of such a problem is variation of the elapsed time in the difference between the final cleaning time stored in the EEPROM at the unloading time and the time when the user operates the printer for the first time. The variation occurs because the final cleaning time is determined according to the time of shipment of the printer, or the time before the shipment, and the time when the user operates the printer for the first time also varies.

Therefore, in this embodiment, the initial value of the final cleaning time at the unloading time is set to a time in the future for selecting cleaning operations suitable for the unloading time. The flow of the processing procedures is the same as in the case of FIG. 3.

When the user gives the host an instruction to start printing for the first time after he/she bought the printer, the elapsed time, which is the difference between the final cleaning time and the print-data receiving time, is calculated at step S4 as shown in FIG. 3. Since the initial value of the final cleaning time is set to a time in the future in this embodiment, the value of the difference or the elapsed time at the time when the user performs his/her first printing operations becomes negative. When the value of the elapsed time is negative, the type of cleaning is selected with reference to a table shown in FIG. 5 at step S5. Accordingly, cleaning that is suitable for the unloading time is performed.

The table in FIG. 5 shows cleaning operations that are performed when the elapsed time is less than 0. Such cleaning operations are not shown in the table in FIG. 4. Therefore, when the elapsed time calculated at step S4 becomes negative, it is determined that the printer is being unloaded, and cleaning suitable for the unloading time can be selected. Thus, the time information of the host and that of the printer can be synchronized.

Further, in this embodiment, the initial value of the final cleaning time, which is set to a time in the future, is determined by adding time by as much as the lifecycle of the printer to the shipment time of the printer. This lifecycle is determined or set according to a predetermined period in which the printer is expected to be used. Subsequently, the elapsed time calculated at step S4 at the unloading time at which the first printing operations are performed becomes less than 0 in most cases. Accordingly, the cleaning, which is suitable for the unloading time, can be performed.

As has been described, when the printer is unloaded, the initial value of the final cleaning time stored in the EEPROM, which is recording means to store the final cleaning time, is set to a time in the future. Therefore, when the user gives the printer the instruction to start printing, it can be determined by the elapsed time whether or not the printing operation is performed for the first time after the user bought the printer. Thus, it becomes possible to perform the cleaning suitable for the first printing operations. When the first cleaning operations are performed, the time that elapsed since cleaning was performed last is negative (the negative value, less than 0 hour) because the final cleaning time has been set to a time in the future. By using the table showing the types of cleaning corresponding to the elapsed time, the cleaning suitable for the first printing can be performed.

Some of the known ink-jet printers store time information about the previous cleaning and perform cleaning operations on the basis of time that elapsed from when the previous cleaning operations are performed. In such cases, the value of the elapsed time is positive. However, in the present invention, the initial value of the final cleaning time is set to a time in the future. Therefore, when the first printing operations are performed, the value of the calculated elapsed time becomes negative. Although the value is negative, preliminary operations corresponding to the elapsed time are performed before the printing is started. Thus, according to the present invention, the preliminary operations suitable for the first printing operations can be performed.

In the above-described embodiments, the cleaning operations for the ink-jet heads of the exemplary ink-jet printers have been described as the preliminary operations, which are performed before printing is started. However, the present invention is not limited to the above-described configurations but can be used to perform preliminary operations other than the cleaning operations before starting printing.

When the printer has a fuser for performing fusing by heating, or a fuser for promoting the fusing by heating, the preliminary heating of the fuser can be performed as the preprinting preparation operation. Further, when the printer performs other preprinting preparation operations, such as aligning the stepping motor and register processing the printer head on the basis of the standard position, the present invention can be applied to such operations.

According to the above-described embodiments, the EEPROM is used as the storing means for storing the time information about the time when the cleaning operations are performed. However, a battery-protected RAM or other types of storing means can also be used for the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printer for performing printing operations on a recording medium on the basis of data transmitted from an information processing apparatus, comprising:
    preprinting preparation means for performing predetermined preparation operations, which are performed before the printing operations are performed, with first time information representing the time when the predetermined preparation operations were last performed, and with an initial value of the first time information being set to a future time projected to be later than the shipment time of the printer;
    storing means for storing first time information indicating the time when the predetermined preparation operations were last performed;
    controlling means that (i) receives second time information indicating the current time transmitted from the information processing apparatus, (ii) calculates the time elapsed between the time indicated by the first time information, representing the time when the predetermined preparation operations were last performed, and the time indicated by the second time information, representing the current time, and (iii) controls the predetermined preparation operations on the basis of the elapsed time; and
    information updating means for updating the first time information stored in the storing means at the time when the predetermined preparation operations are performed,
    wherein the controlling means controls the predetermined preparation operations irrespective of whether the value of the elapsed time is calculated to be positive or negative.

2. A printer according to claim 1, wherein the initial value of the first time information stored in the storing means is set to a time determined by adding a predetermined time to the shipment time of the printer.

3. A printer according to claim 1, wherein when the value of the elapsed time is calculated to be negative, the control means controls the predetermined preparation operations so as to suit to a case where the printing operations are performed in the printer for the first time.

4. A printer according to claim 1, wherein the printer is an ink-jet printer, which performs printing by ejecting ink onto the recording medium by using an ink-jet head that ejects ink, and the predetermined preparation operations are cleaning operations performed by the ink-jet head.

5. A printer according to claim 4, wherein the control means controls the ink-jet head to perform the cleaning operations corresponding to the elapsed time.

6. A printer according to claim 4, further comprising:
    a table that defines the cleaning operations corresponding to the elapsed time; and
    wherein the control means refers to the table on the basis of the elapsed time and selects the cleaning operations.

7. A printer according to claim 4, further comprising:
    preliminary ejection means for performing cleaning operations by making the ink-jet head eject the ink; and
    suction means for performing ink discharge by applying a suction to the ink-jet head, wherein the control means performs the cleaning operations corresponding to the elapsed time by using the preliminary ejection means and the suction means.

8. A method of controlling a printer for performing printing operations on a recording medium on the basis of data transmitted from an information processing apparatus and predetermined preparation operations before the printing operations are performed, comprising the steps of:
receiving first time information indicating the current time from the information processing apparatus;
calculating time elapsed between the time indicated by the first time information, representing the current time, and a time indicated by second time information, representing the time when the predetermined preparation operations were last performed, with the initial value of the second time information being set to a time projected to be later than the shipment time of the printer, the second time information being stored in the storing means of the printer;
preparing and performing the predetermined preparation operations on the basis of the calculated elapsed time;
updating the second time information stored in the storing means at the time when the predetermined preparation operations are performed,
wherein the step of preparing is performed by controlling the predetermined preparation operations irrespective of whether the value of the calculated elapsed time is positive or negative.

9. A method according to claim 8, wherein the initial value of the second time information stored in the storing means is set to a time determined by adding a predetermined time to the shipment time of the printer.

10. A method according to claim 8, wherein when the value of the elapsed time is calculated to be negative, the preparation operations are controlled so as to suit to a case where the printing operations are performed in the printer for the first time.

11. A printer, which is connected to an information processing apparatus comprising a program for giving the printer an instruction about operations and performs printing on the basis of data transmitted from the information processing apparatus, comprising:
communication means for communicating with the information processing apparatus;
receiving means for receiving time information transmitted from the information processing apparatus via the communication means;
storing means for storing the value of an initial time, the initial time having been set at the shipment time of the printer;
calculating means for comparing the time information and the value of the initial time and calculating the difference therebetween; and
updating means for updating the value of the initial time according to the time information,
wherein the initial time is set to a future time later than the shipment time of the printer.

12. A printer according to claim 11, wherein the initial time of the printer is set to a time in the future determined by adding a predetermined time to the shipment time of the printer.

13. A printer according to claim 11, wherein the initial time of the printer is set to a time in the future determined by adding a time as long as the lifecycle of the printer to the shipment time of the printer.

14. A printer according to claim 11, wherein the initial time of the printer is set to a time in the future determined by adding a time as long as three years or more to the shipment time of the printer.

15. A printer according to claim 11, wherein the program is a printer driver and the printer receives the time information from the information processing apparatus via the printer driver.

16. A printer according to claim 11, wherein the updating is performed at the time when the printer receives the time information from the information processing apparatus for the first time after the power of the printer is turned on.

17. A printer according to claim 11, wherein the preparation operations are performed, the preparation operations being required for performing printing corresponding to the calculated difference.

18. A printer according to claim 11, wherein the printer is an ink-jet printer, and the preparation operations are any one of ink-suction recovery, preliminary ejection, preliminary heating of a fuser, aligning of a stepping motor, register processing of a printer head on the basis of the standard position thereof, initializing of a memory such as a command buffer or the like.

19. A printer for performing a printing operation on the basis of data transmitted from an external information processing apparatus, comprising:
a printer head for ejecting ink;
a recovery system for performing recovery processing for the printer head;
a memory for storing time information; and
controlling means for controlling the recovery processing on the basis of the time information, and updating the time information based on the time when the recovery processing is performed,
wherein the controlling means modifies the type of recovery processing performed on the basis of whether the time information indicates a time later than the current time or a time earlier than the current time.

* * * * *

UNITED STATES PATENT AND TRADEMARK OFFICE
CERTIFICATE OF CORRECTION

PATENT NO. : 7,349,122 B2  
APPLICATION NO. : 10/915357  
DATED : March 25, 2008  
INVENTOR(S) : Atsushi Sakamoto et al.

It is certified that error appears in the above-identified patent and that said Letters Patent is hereby corrected as shown below:

IN THE DRAWINGS:
Sheet 3, Figure 3, "PRELIMINARLY" should read --PRELIMINARY-- (each occurrence).
Sheet 4, Figure 4, "PRELIMINARLY" should read --PRELIMINARY-- (each occurrence).
Sheet 5, Figure 5, "PRELIMINARLY" should read --PRELIMINARY-- (each occurrence).

COLUMN 9:
Line 23, "elapsed" should read --elapses--.
Line 31, "elapsed" should read --elapses--.
Line 54, "register precessings" should read --register up the processings of--.

Signed and Sealed this

Seventh Day of April, 2009

JOHN DOLL
*Acting Director of the United States Patent and Trademark Office*